Jan. 1, 1963 M. L. LEVENE 3,071,757

DATA STORAGE APPARATUS

Filed Dec. 2, 1957

INVENTOR.

Martin L. Levene

BY Morris A. Rakkin

ATTORNEY.

United States Patent Office 3,071,757

Patented Jan. 1, 1963

3,071,757
DATA STORAGE APPARATUS

Martin L. Levene, Philadelphia, Pa., assignor to Radio Corporation of America, a corporation of Delaware Filed Dec. 2, 1957, Ser. No. 700,077
9 Claims. (Cl. 340—174.1)

This invention relates to data storage apparatus, and particularly to data storage apparatus using a movable member.

Data-handling systems, for example, electronic digital computers, frequently use movable devices, such as a drum or disc, for storing data. The data or information may be encoded in pulse form or may be a continuous, time-varying, modulated wave. In either case, the data is stored in a track or channel of suitably retentive material, swept out by a transducing means during one revolution of the device carrying the material.

In certain systems, one or more separate transducing means are used for each separate channel. Associated with each transducing means are separate electronic circuits used in writing data onto, and reading data from, the material, and separate gating means for selecting desired ones of the transducing means for either writing or reading.

It is desirable to reduce the number of transducing means and their associated equipment. Also, in certain systems, the maximum amount of data that can be handled as a unit is artificially fixed due to the finite length of the channel. Although the channel length can be increased by increasing the size of the device, it sometimes is uneconomical and difficult to do so.

It is an object of the present invention to provide an improved data storage apparatus, of the movable type, which requires fewer transducing means and which effectively increases the channel length.

Another object of the invention is to provide data storage apparatus requiring fewer transducing means to record a given amount of data.

Still another object of the invention is to provide improved data storage apparatus in which the movable device is moved both angularly and linearly relative to a transducing means.

According to the present invention, one member having retentive material thereon is rotated relative to another member having transducing means for coupling to said material and, in addition, means are provided for reciprocating one of the members relative to each other at a desired frequency. The period of the reciprocal motion is arranged so that a plurality of separate spiral channels are swept out by the transducing means.

A feature of the invention is the simplification of the construction in that the one member need be accurately located along only one axis, thereby reducing the number of accurate machine operations and parts required in other prior apparatus of similar type.

Figure 1:
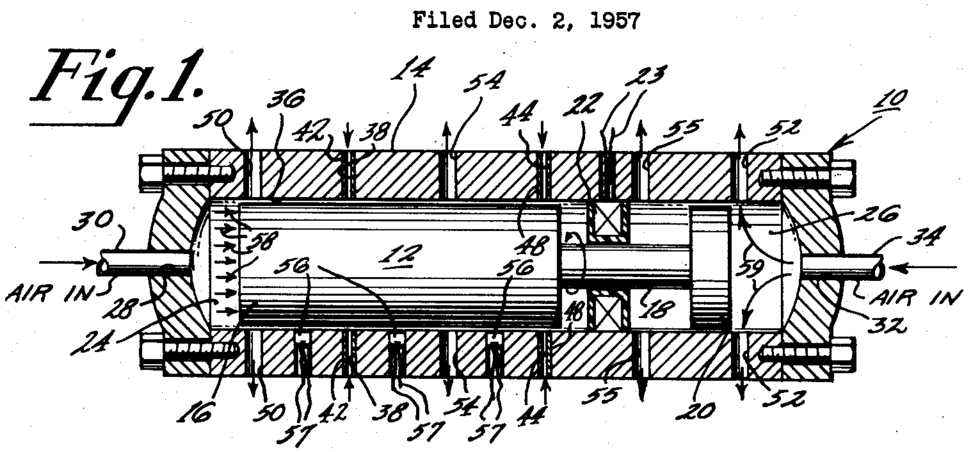
FIG. 1 is a front elevational view, in section, of a storage apparatus according to the invention.

The one member is provided in the exemplary data storage apparatus 10 of FIG. 1 by a shaft 12 mounted for rotation within the other member comprising a hollow sleeve 14. The shaft 12 may be solid, as shown, or hollow. End caps are fastened by any suitable means, such as bolts, at either end of the sleeve 14. The shaft 12 is provided with a coating of retentive material such as the magnetizable material 16 indicated. A motor armature 18 is attached by any suitable means, such as a press fit, to one end of the shaft 12. The other end of the motor armature 18 is fitted with an annular flange 20 of substantially the same diameter as the shaft 12. The motor field winding 22 is fitted within the sleeve 14 for rotating the motor armature 18 and the shaft 12. A cable 23 conducts electrical current to the motor winding 22. A pair of piston chambers 24, 26, are provided at either end of the sleeve 14 for reciprocally oscillating the shaft 12. The first piston chamber 24 is included between the left-hand end of the shaft 12 and the inner wall of the sleeve 14. The second piston chamber 26 is included between the end of the annular flange 20 and the inner wall of the sleeve 14.

A pressurized-fluid inlet port 28 connects the first piston chamber 24 to a first inlet conduit 30. A second fluid inlet port 32 connects the second piston chamber 26 to a second inlet conduit 34. The first and second inlet conduits 30 and 34 may be connected to any suitable source of pressurized fluid, not shown.

A third group 38 and a fourth group 44 of inlet ports are drilled circumferentially around the sleeve 14. Orifice inserts 42 are provided in the third group 38 of inlet ports, and orifice inserts 48 are provided in the fourth group 44 of inlet ports. The orifice inserts 42 and 48 are used to introduce the pressurized fluid to the bearing space 36 between the inner wall of the sleeve 14 and the periphery of the shaft 12. A common source, not shown, of pressurized fluid may be used for supplying fluid to the radial-bearing space 36.

First and second end exhaust ports 50 and 52 are drilled in the sleeve 14 to connect the piston chambers 24 and 26 to the atmosphere. Third and fourth middle exhaust ports 54 and 55 are drilled in the sleeve 14 to connect the radial-bearing space 36 to the atmosphere.

A plurality of transducing means 56 are fixed, as by a light press fit, in the sleeve member 14 for coupling to the magnetizable material 16 on the shaft 12. Each of the transducing means 56 is provided with a pair of signal leads 57. Signals are applied across the signal leads 57 during the writing and reading of information to and from the magnetizable material 16.

In operation, pressurized fluid is introduced into the radial-bearing space 36 via the orifices of inserts 42 and 48. The pressurized fluid from the left-hand orifices 42 flows in either direction along the radial bearing space 36 and exhausts into the atmosphere through the first and third exhaust ports 50 and 54. The pressurized fluid from the right-hand orifices 48 also flows in the left-hand direction along the radial bearing space 36 and exhausts into the atmosphere through the third exhaust ports 54. In addition, the fluid from the right-hand orifices 48 flows to the right along the radial-bearing space 36, then flows by and through the motor windings 22, and then exhausts into the atmosphere via the fourth exhaust ports 55. The latter portion of the fluid aids in cooling the motor windings 22.

The pressurized fluid flowing in the radial-bearing space 36 provides a thin, pressurized film between shaft 12 and the sleeve 14. The through-bore of the sleeve 14 and the surface of the shaft 12 are accurately machined to provide a relatively close radial spacing, say about one-half milliinch between the shaft 12 and the sleeve 14. The thin film essentially permits a substantially frictionless, reciprocal movement of the shaft 12 within the sleeve 14.

After the pressurized fluid is introduced into the radial-bearing space 36, electric current is applied to the motor cable 23, thereby producing rotation of the shaft 12 about its horizontal axis. Any desired rotational speed of the shaft 12 may be achieved by using a suitable electric motor. In practice, a synchronous motor is used to rotate the shaft 12 at a desired speed, say, in the order of 1800 to 3600 revolutions per minute.

Assume, now, that the shaft 12 initially is in the position shown in the drawing, with the extreme left-hand exhaust port 50 closed and the extreme right-hand exhaust port 52 open. After the shaft 12 is up to its desired speed, pressurized fluid is applied at the same time to the first and second inlet ports 28 and 32. The pressurized fluid from the left-hand inlet port 28 fills the first piston chamber 24 and applies a relatively constant force against the left end of the shaft 12 due to the closed exhaust port 50. The arrows 58 against the end of the shaft 12 are used to indicate the force applied to the shaft 12. Any pressurized fluid escaping into the atmosphere between the bearing space 36 and the exhaust port 50 is comparatively small in volume due to the close spacing between the shaft 12 and the sleeve 14. Accordingly, this escaping fluid may be disregarded, for the purpose of the present invention, as any suitable pressure regulator can fully compensate for this small leakage.

The fluid is introduced into the second piston chamber 26 via the second inlet port 32 and exhausts directly into the atmosphere through the open exhaust ports 52, as indicated by the arrows 59. Consequently, the pressure in the second chamber 26 is at, or very close to, atmospheric pressure, and no appreciable counter-force is applied to restrain the rightward movement of the shaft 12. Accordingly, the net force applied to the left end of the shaft 12 causes the shaft 12 to move from its initial stop or "dwell" position. As the applied pressure to the left end of the shaft 12 is relatively constant, the movement of the shaft 12 to the right accelerates until the displacement of the shaft 12 begins to uncover the left end exhaust ports 50 and to cover the right end exhaust ports 52. At this time, the rightward movement of the shaft 12 is slowed due to the force applied to the end of the flange 12 by the pressurized fluid which begins to build up in the second piston chamber 26. The rightward movement of the shaft 12 finally is stopped after the right-end exhaust ports 52 are closed by the flange 20 and the left-end exhaust ports 50 are opened. The pressurized fluid from the first piston chamber 24 now escapes directly to the atmosphere through the open exhaust ports 50, thereby removing the force from the left end of the shaft 12. The process is now repeated, with the shaft 12 being moved from its right "dwell" position to the left, in similar manner, until the left-end exhaust ports 50 are closed and the right-end exhaust ports 52 are opened.

The reciprocation of the shaft 12, due to the alternate build-up and the removal of the pressurized fluid in the piston chambers 24 and 26, is similar to that obtained in a so-called free-piston engine. An article by Paul M. Mueller, entitled "Air Lubricated Bearings," published in the "Annual Handbook of Product Engineering" (1953), pages J2–J5, describes free piston action in connection with FIG. 7 thereof. For a given fluid pressure and given mechanical dimensions, the shaft 12 reciprocates at a constant known frequency.

Figure 2:
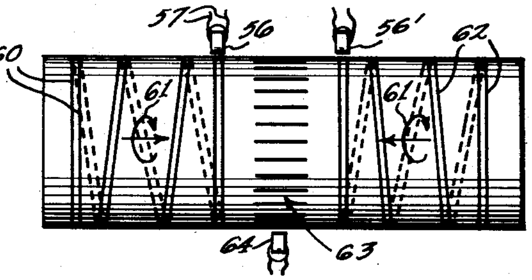
FIGS. 2 and 3 are schematic diagrams of the shaft portion of the apparatus of FIG. 1 and useful in explaining the operation of that apparatus.

For convenience of explanation, only two transducing means 56 and 56' of FIG. 1 are shown in the schematic diagram of FIG. 2. Also, in FIG. 2, the stroke of the shaft 12 and pitch dimensions of the helices thereon are somewhat exaggerated. As shown in FIG. 2, during the rightward movement of the shaft 12, signals applied to the left-hand transducing means 56 are recorded in a channel along a helix 60. The helix 60, due to the clockwise rotation of the drum, as indicated by the arrows 61, is in the form of a right-hand spiral. Note that the pitch dimension of the helix 60 changes as the shaft 12 moves linearly. During the "dwell" periods, the pitch is compressed and, during the accelerated periods, the pitch is expanded. Similarly, when the shaft 12 moves in the leftward direction, signals applied to the transducing means 56' are recorded in a channel along another helix 62. The helix 62 takes the form of a left-hand spiral.

Because the instantaneous speed of rotation of the synchronous motor can vary slightly over a large number of revolutions of the shaft 12, there is a possibility that the recorded helix will be displaced somewhat relative to the fixed head. That is, the motor "hunts" by a small amount about its synchronous speed due, for example, to line or load variations. In practice, however, the percentage loss of the recorded signal is relatively small for commercially available synchronous motors.

It should be noted that the displacement does not result in the loss of information content but only in its amplitude, which amplitude loss also is found in conventional drums for other reasons.

There are several different modes of operating the apparatus of FIG. 1. Note that both transducing means 56 and 56' sweep out both left and right-hand helices as the shaft 12 moves in the left and then the right directions. In the simplest mode of operation, the transducing means 56, for example, is activated only when the shaft 12 is moving in the rightward direction. Thus, only the right-hand helix 60 is used to store information from the transducing means 56. The transducing means 56' is activated only when the shaft 12 moves in the leftward direction. Thus, only the left-hand helix 62 is used to store information from the transducing means 56'. A timing track may be provided in the form of spots or stripes, such as the stripes 63 of FIG. 2, of magnetic material around the circumference of the shaft 12. The timing track is used as an aid in locating and synchronizing the reading and writing of information on the shaft 12. Timing tracks are well-known in the data-storage art; for example, any one timing track may be used as the starting point in recording any one item of information. Suitable gating circuitry (not shown) is coupled to the transducing means 64 which cooperates with the timing track.

Because the speed of revolution of the shaft 12 and its speed of reciprocation are known, the crossover points of the left and right-hand helices of any one transducing means 56 can be accurately determined. By providing auxiliary gating circuitry, not shown, to inhibit the storage of information at these known crossover points, each transducing means 56 can be activated without regard to the direction in which the shaft 12 is moving.

Figure 3:
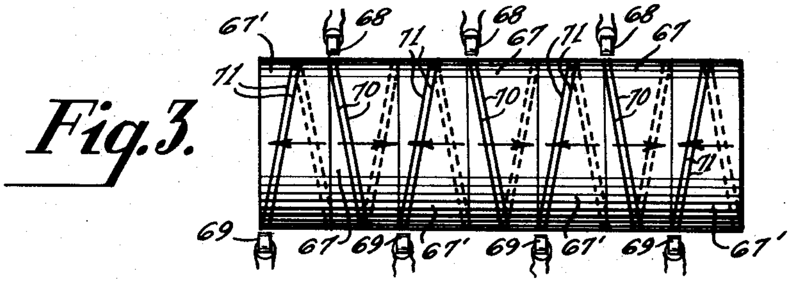

Another mode of operating the apparatus of FIG. 1 is shown in FIG. 3. In FIG. 3, the shaft 12 is divided, for example, into seven discrete areas 67, each less than the length of the piston stroke of the shaft 12 in one direction. The length of an area 67 corresponds to the distance the shaft 12 moves from its "dwell" position to a point at which it just begins to accelerate. Three alternate ones of the areas 67 correspond to the movement of the shaft from the left-hand "dwell" position to an accelerated position; and the other four alternate ones of the areas 67, each designated 67', correspond to movement of the shaft 12 from the right-hand "dwell" position to an accelerated position. Three separate transducing means 68 are provided for each area 67, and four separate transducing means 69 are provided for each separate area 67'. Again, the helices 70 of the areas 67 are in the form of right-hand spirals, and the helices 71 of the areas 67' are in the form of left-hand spirals. For convenience of drawing, the pitch of the helices 70 and 71 is exaggerated. Note that, in FIG. 3, only the compressed portions of the helices are used for storing the information.

Still another mode of operating the apparatus of FIG. 1 is to use certain of the transducing means for writing information into the apparatus during one "dwell" period, and using others of the transducing means for reading out the previously written information during the next dwell period. For example, referring to FIG. 3, assume that adjacent pairs of the transducing means 69, 68 and 68, 69 have a center-to-center spacing equal to the length of the piston stroke. For this mode of operation, each helix 71, 70 is essentially a single-turn helix. Assume, now, that at the left-hand "dwell" position, information is stored in the magnetizable material, using the first three transducing means 69, beginning at the left. The shaft 12 then moves from its left-hand "dwell" position to its right-hand "dwell" position. At this time, the three transducing means 68 read out the information previously stored by the three transducing means 69.

Figure 4:
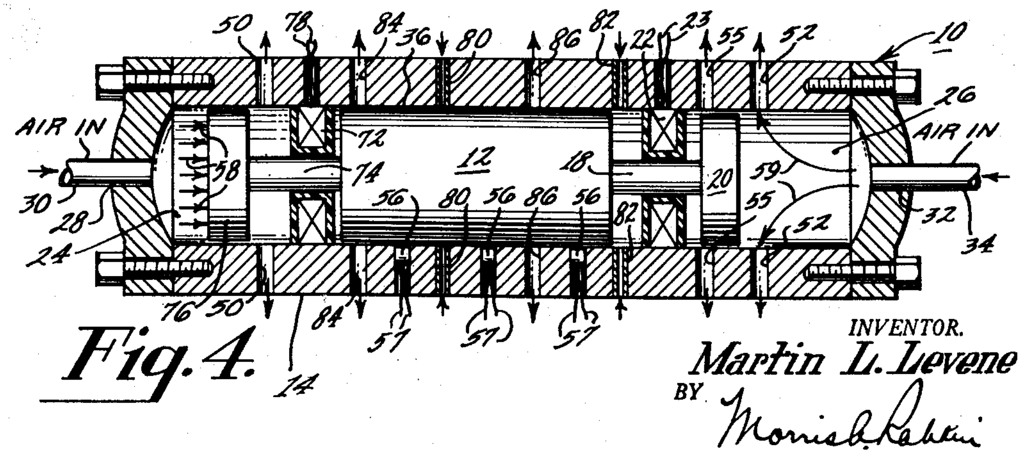
FIG. 4 is a front elevational view, in section, of another form of storage apparatus according to the invention.

In certain applications, it is desirable to control, selectively, the length and/or the frequency of the piston stroke. This selective control can be obtained by providing a solenoid 72, as shown in FIG. 4. In FIG. 4 the extreme left portion 74 of the shaft 12 is of reduced diameter for reciprocal movement within a solenoid 72. An annular flange 76 is fastened, as by a press fit, onto the end portion 74 of the shaft 12. Electric current is selectively applied to the solenoid windings 78 by any suitable means, not shown. Orifice inserts 80 and 82 are used to supply pressurized fluid to the radial-bearing space 36, and exhaust ports 84 and 86 are used to exhaust the fluid from the space 36 to the atmosphere. Otherwise, the apparatus of FIG. 4 is similar to that of FIG. 1.

The embodiment of FIG. 4 may be operated in the same manner as that described for FIG. 1. Additional flexibility of operation, however, is achieved in the embodiment of FIG. 1. For example, by selectively activating the solenoid 72, the piston stroke can be adjusted for coupling different combinations of the transducing means to one another at different times. Also, the period of the reciprocation of the shaft 12 can be adjusted to obtain different delay periods for writing and reading information by selectively activating the solenoid 72.

There has been described herein improved data storage apparatus of the movable type which provides advantages, for example, in reducing the number of transducing means. In this connection, it is to be noted that a reduction in the number of transducing means effects a greater overall reduction in the relatively expensive auxiliary equipment required for use with the transducing means. If desired, each transducing means may be provided with a plurality of multiple-channel read-write leads. Such multiple-channel leads are well-known in the data storage art. Observe, also, that the apparatus of the invention is simpler in construction than prior apparatuses of similar type. That is, an accurate machining operation is required only for the through-bore of the sleeve 12 and the periphery of the shaft 12.

What is claimed is:

1. In a data storage apparatus, the combination of first and second members rotatably mounted with respect to each other, one of said members having retentive material on one surface thereof, and the other of said members having transducing means for coupling to said material, with means including first and second piston chambers cooperating with said members for applying forces alternately to one and the other of said chambers for reciprocally oscillating one of said members relative to the other.

2. In a data storage apparatus having first and second members, one of which carries retentive material and the other of which carries transducing means, the improvement comprising first and second piston chambers, said members being mounted in the manner of a free piston-type engine between said chambers, means for rotating one of said members relative to the other, and means for applying forces alternately to said first and second piston chambers for reciprocating said members relative to each other, said transducing means being magnetically coupled to said material during reciprocation of said members.

3. In data storage apparatus, the combination of a shaft carrying retentive material on the surface thereof, a sleeve member around said shaft, means for rotating said shaft within said sleeve member, transducing means in said sleeve member for cooperating with said retentive material, and means including two piston chambers arranged for applying forces alternately to opposite ends of said shaft for reciprocally oscillating said shaft within said sleeve member.

4. In data storage apparatus, first and second members rotatably mounted with respect to each other, one of said members having retentive material on the surface thereof, and the other having transducing means for coupling to said material, the end portions of said members being arranged to form first and second piston chambers, means for applying forces alternately to said first and second chambers for reciprocating one of said members relative to the other, and means for supplying pressurized fluid to both said chambers at the same time.

5. In a data storage apparatus, the combination of a shaft member having magnetizable material thereon, a sleeve member around said shaft having transducing means fixed therein for coupling to said material, end caps at either end of said sleeve member having openings therein for receiving pressurized fluid, said end caps cooperating with said sleeve member to form piston chambers, means for rotating said shaft within said sleeve member, exhaust ports and means for alternately covering and uncovering said exhaust ports whereby said piston chambers are alternately expanded and contracted to reciprocate said shaft relative to said sleeve.

6. In data storage apparatus, the combination as claimed in claim 5, including inlet and exhaust ports in said sleeve member for providing a pressurized fluid radial-bearing means between said shaft and sleeve members.

7. In data storage apparatus, the combination of first and second members, first and second piston chambers, said first member being mounted within a second member and between said chambers in the manner of a free piston-type engine, means for rotating one of said members relative to the other, one of said first and second members having retentive material on one surface thereof, and the other of said first and second members having transducing means for coupling to said material, with means for selectively controlling the reciprocal frequency of said engine.

8. In data storage apparatus, the combination of first and second members one of which carries retentive material and the other of which carries transducing means for coupling to said material, the improvement comprising first and second piston chambers, one of said members being mounted within the other and between said chambers for reciprocal movement relative to each other in the manner of a free piston-type engine, means for rotating one of said members relative to the other with means for adjusting the length of the piston stroke of said engine.

9. In data storage apparatus, the combination of a shaft carrying magnetizable material on the surface thereof, a sleeve member around said shaft having magnetic transducing means fixed therein for coupling to said material, motor means for rotating said shaft within said sleeve member, means for reciprocally oscillating said shaft within said sleeve member, pressurized fluid bearing means for supporting said shaft within said sleeve member and means coupled to said shaft for controlling the reciprocal frequency thereof.

References Cited in the file of this patent

UNITED STATES PATENTS

| | | |
|---|---|---|
| 2,229,293 | Huntley | Jan. 21, 1941 |
| 2,413,965 | Goldsmith | Jan. 7, 1947 |
| 2,692,803 | Gerard | Oct. 26, 1954 |
| 2,787,750 | Jones | Apr. 2, 1957 |
| 2,965,721 | Hollabaugh et al. | Dec. 20, 1960 |

OTHER REFERENCES

"Air Lubricated Bearings," by Paul M. Mueller, reprinted from Product Engineering Handbook, 1953.